(12) United States Patent
Nishio et al.

(10) Patent No.: US 7,722,010 B2
(45) Date of Patent: May 25, 2010

(54) VALVE HOLDING MEMBER

(75) Inventors: Takuya Nishio, Tokyo (JP); Jin Yamashita, Tokyo (JP); Hideyuki Sanada, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 304 days.

(21) Appl. No.: 11/666,513

(22) PCT Filed: Oct. 20, 2005

(86) PCT No.: PCT/JP2005/019333

§ 371 (c)(1),
(2), (4) Date: Apr. 27, 2007

(87) PCT Pub. No.: WO2006/046470

PCT Pub. Date: May 4, 2006

(65) Prior Publication Data

US 2009/0033086 A1 Feb. 5, 2009

(30) Foreign Application Priority Data

Oct. 28, 2004 (JP) .............................. 2004-313806

(51) Int. Cl.
*F16K 51/00* (2006.01)
*F16L 29/00* (2006.01)
*F16L 37/28* (2006.01)

(52) U.S. Cl. .................. 251/337; 251/149.9; 251/149.6

(58) Field of Classification Search .............. 251/149.6, 251/149.9, 149.3, 149.1; 137/540, 542, 543.13, 137/614.04

See application file for complete search history.

(56) References Cited

U.S. PATENT DOCUMENTS 2,692,731 A * 10/1954 Farrar .......................... 236/34

(Continued)

FOREIGN PATENT DOCUMENTS

CN 2427706 Y 4/2001

(Continued)

OTHER PUBLICATIONS

Korean Office Action issued Sep. 23, 2008 in Korean Patent Application No. 2007-7009390 (with partial translation).

(Continued)

*Primary Examiner*—John K. Fristoe, Jr.
*Assistant Examiner*—Marina Tiet Jen
(74) *Attorney, Agent, or Firm*—Brinks Hofer Gilson & Lione

(57) ABSTRACT

A valve holding member made of a sheet metal includes a hub part (33) having a guide hole (34) through which a valve stem (23) and a plurality of arm parts (32) formed at the peripheral edge of the hub part. The arm parts are extend from the peripheral edge in an axial direction and in a radially outward direction with respect to the axis of the valve stem. The valve holding member also includes any one of a first reinforcing protrusion (35) formed in at least one of the arm parts which extends along a longitudinal direction of the at least one arm part and protrudes radially outward or inward with respect to the axis of the valve stem, a tubular reinforcing part (35c, 35e) formed around the guide hole and extending from the hub part in the axial direction, and a second reinforcing protrusion (35b) formed in the hub part and protruding in the axial direction.

1 Claim, 8 Drawing Sheets

U.S. PATENT DOCUMENTS 4,846,506 A * 7/1989 Bocson et al. ................. 285/4

FOREIGN PATENT DOCUMENTS

| | | |
|---|---|---|
| JP | 50-117421 | 9/1975 |
| JP | 50-117421 U | 9/1975 |
| JP | 51-98825 U | 8/1976 |
| JP | 55-34508 U | 3/1980 |
| JP | 55-33091 U | 8/1980 |
| JP | 59-105683 U | 7/1984 |
| JP | 1-74388 U | 5/1989 |
| JP | 2-84073 U | 6/1990 |
| JP | 3-282087 | 12/1991 |
| JP | 4-28277 U | 3/1992 |
| JP | 5-47070 Y2 | 12/1993 |
| JP | 7-14709 Y2 | 4/1995 |
| JP | 7-228301 | 8/1995 |
| JP | 7-228301 A | 8/1995 |
| JP | 2536762 Y2 | 2/1997 |
| JP | 2001-74153 A | 3/2001 |
| JP | 2005-315376 A1 | 11/2005 |
| JP | 7-30849 | 4/2009 |

OTHER PUBLICATIONS

Chinese Office Action issued Nov. 21, 2008 in Chinese Application No. 200580037302.5 (with translation).
Japanese Office Action issued Feb. 12, 2009 in Japanese Patent Application No. 2004-313806, 3 pages.
International Preliminary Report issued May 1, 2007.
Notification of Office Action from the Korean Intellectual Property Office, dated Aug. 12, 2009, with translation (8 pages).

* cited by examiner

VALVE HOLDING MEMBER

FIELD OF THE INVENTION

The present invention relates to a valve holding member for holding a valve for opening and closing a fluid passage of a pipe coupling and, more particularly, to a valve holding member made of a single sheet metal.

BACKGROUND OF THE INVENTION

In a pipe coupling which employs a poppet valve for opening and closing a fluid passage, a valve holding member is used, which has a hub part through which a valve stem of the poppet valve passes, and a plurality of arm parts extending radially outwardly from the hub part and firmly engaging with the inner surface of the fluid passage to retain the hub part in the center of the fluid passage. The valve is set such that a valve head thereof is pressed against a valve seat formed on the inner surface of the fluid passage by means of a coil spring disposed around the valve stem and between the hub part and the valve head.

The present applicant has filed an application related to a valve holding member characterized in that the valve holding member is made of a single sheet metal (Japanese Examined Utility Model Publication No. S55-33091). This valve holding member has an advantage of being fabricated at low cost. However, due to its low stiffness, the valve holding member is mainly used for low-pressure and small-diameter pipe couplings, in which a biasing force of a coil spring acting on a valve is small.

However, there is a need for a valve holding member made of a sheet metal which has a high stiffness for withstanding a large spring biasing force so as to be used for high-pressure and large-diameter pipe couplings. In order to increase stiffness, there is a method in which the thickness of the sheet metal and/or the width of arm parts are increased. However, if a thick sheet metal is used, the arm parts lacks resilience, whereby it becomes difficult to insert the valve holding member into a pipe coupling. Further, if the arm parts are made wider, a flow resistance of the fluid passage is made greater.

Conventionally, as a high-strength valve holding member for high-pressure and large-diameter pipe couplings, there have been used block-type valve holding members (which are sufficiently thick in the fluid passage direction of a pipe coupling) as disclosed in Japanese Unexamined Utility Model Publication No. 59-105683, and ring-type valve holding members (in which arm parts are connected together by means of a ring) as disclosed in Japanese Unexamined Utility Model Publication No. 51-98825. In fabricating the above valve holding members, however, it is necessary to machine a blank material or to mold powder metal. As a result, the fabricating cost and weight of the products increase compared to a sheet metal valve holding member which can be fabricated by pressing.

It is an object of the present invention to provide a sheet metal valve holding member which has reinforcing structures to increase its stiffness, thereby allowing them to be used for high-pressure and large-diameter pipe couplings.

SUMMARY OF THE INVENTION

The present invention provides a valve holding member (30a) made of a sheet metal for holding a valve (indicated by reference numeral 20 in embodiments described later) displaceably along a fluid passage of a pipe coupling for opening and closing the fluid passage. The valve holding member includes a hub part (33) having a guide hole (34) through which a valve stem (22, 23) of the valve extends and a plurality of arm parts (32) formed at the peripheral edge of the hub part. The arm parts are circumferentially spaced apart from each other and extend from the peripheral edge in an axial direction and in a radially outward direction with respect to the axis of the valve stem. The valve holding member also includes any one of a first reinforcing protrusion (35) formed in at least one of the arm parts which extends along a longitudinal direction of the at least one arm part and protrudes radially outward or inward with respect to the axis of the valve stem, a tubular reinforcing part (35c, 35d,35e) formed around the guide hole and extending from the hub part in the axial direction, and a second reinforcing protrusion (35b) formed in the hub part and protruding in the axial direction.

This valve holding member is fabricated by a simple process such as pressing whereby the valve holding member is reinforced in its structure so that the valve holding member can be used for high-pressure and large-diameter pipe couplings.

The first reinforcing protrusion (35) and the second reinforcing protrusion (35b) may be formed continuously.

All of the arm parts may be formed so as to extend from the hub part to one side of the axial direction, and a plurality of spring retaining parts (31) may be formed each between each adjacent pair of the arm parts at the peripheral edge of the hub part so as to extend in a direction opposite to the axial direction in which the arm parts extend.

Further, the arm parts have each a distal end (37) engageable with an annular holding shoulder portion formed on the inner wall of the fluid passage of the pipe coupling, and the distal ends may be provided each at the central portion thereof with a non-engagement portion (37') unengageable with the annular holding shoulder portion.

Thus, it is possible to stably hold the sheet metal valve holding member in the pipe coupling even if the distal ends of the arm parts are warped or distorted in a fabrication process.

Specifically, the non-engagement portions may be formed each by notching the central portion of each distal end.

The valve holding member according to the present invention is fabricated by a simple process such as pressing. The valve holding member is reinforced in its structure, so that the valve holding member can be used for high-pressure and large-diameter pipe couplings. It is possible to form the reinforcing structures on the hub part and/or the arm parts such that a flow resistance of the fluid passage is not substantially increased.

BRIEF DESCRIPTION OF THE DRAWINGS

FIG. 1b is an end view of the valve holding member, as viewed in a direction indicated by an arrow A in FIG. 1a.

FIG. 2b is a sectional view taken along line IIb-IIb of FIG. 2a.

FIG. 3b is a sectional view taken along line IIIb-IIIb of FIG. 3a.

FIG. 4b is a sectional view taken along line IVb-IVb of FIG. 4a.

FIG. 5b is a sectional view taken along line Vb-Vb of FIG. 5a.

FIG. 6b is a sectional view taken along line VIb-VIb of FIG. 6a.

FIG. 7b is a sectional view taken along line VIIb-VIIb of FIG. 7a.

FIG. 8b is a sectional view taken along line VIIIb-VIIIb of FIG. 8a.

DETAILED DESCRIPTION OF THE PREFERRED EMBODIMENTS

A preferred embodiment of the present invention will now be described in detail with reference to the accompanying drawings.

Figure 1A:
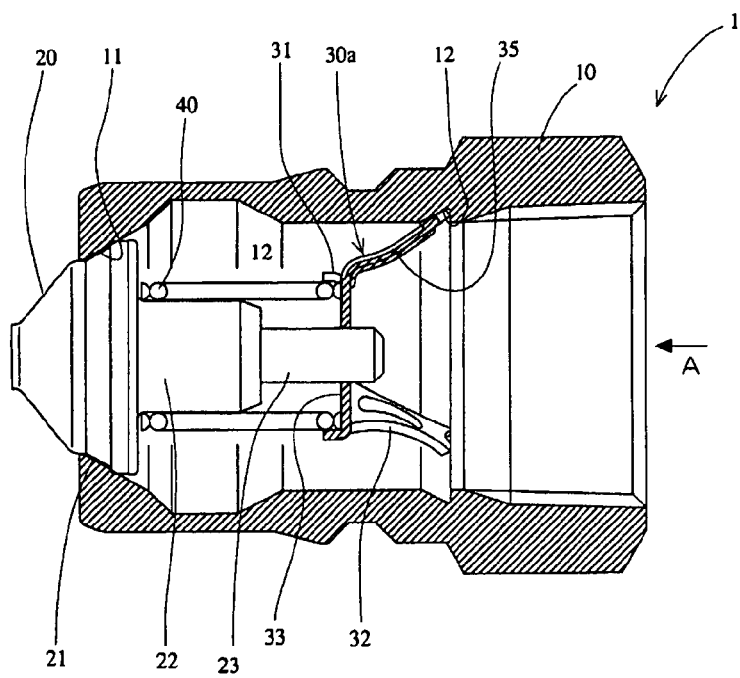
FIG. 1a is a longitudinal sectional view of a male pipe coupling equipped with a valve holding member according to an embodiment of the present invention.
Figure 1B:
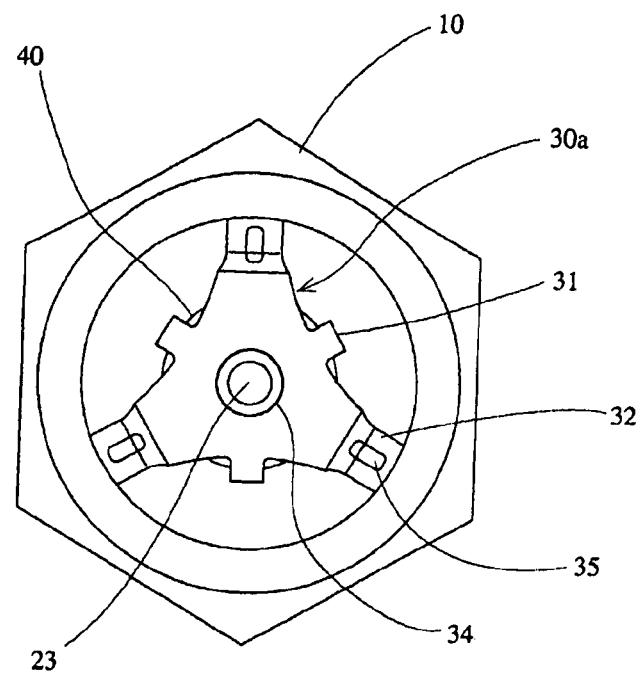

FIG. 1a is a sectional view of a male coupling 1 equipped with a sheet metal valve holding member according to an embodiment of the present invention. FIG. 1b is an end view of the valve holding member, as viewed in a direction indicated by an arrow A in FIG. 1a.

In use, a pipe (not shown) is connected to the right side (as viewed in FIG. 1) of a coupling body 10, while a female coupling (not shown) is connected to the left side of the coupling body 10. The tubular coupling body 10 is provided with a poppet valve 20, a coil spring 40 for biasing the poppet valve 20, and a valve holding member 30a, which retains the coil spring 40.

In assembly of the male coupling 1, the poppet valve 20 and the coil spring 40 are inserted into the coupling body 10, and then the valve holding member 30a is pushed leftward into the coupling body 10 while contracting the coil spring 40. The valve holding member 30a is pushed leftward with arm parts 32 of the valve holding member being engaged with and elastically bent by the inner peripheral surface of the coupling body 10. When the distal ends of the arm parts 32 reach an arm holding shoulder portion 12 formed in the inner peripheral surface of the coupling body 10, the distal ends engage with the arm holding shoulder portion 12, whereby the valve holding member is secured to the coupling body. The poppet valve 20 is biased by the coil spring 40 to firmly engage with a valve seat 11 of the coupling body 10, thereby closing a fluid port 21 through which a fluid passes.

A valve stem large-diameter portion 22 of the poppet valve 20 slidably engages with the inner periphery of the coil spring 40. The valve holding member 30a is provided at the center of a hub part 33 thereof with a guide hole 34 through which a valve stem small-diameter portion 23 extends. The valve holding member 30a is also provided at the peripheral edge of the hub part with spring holding parts 31 adapted to engage with the outer periphery of one end of the coil spring 40. The poppet valve 20 is held by the valve holding member and the coil spring such that the axis of the valve stem extends in the fluid passage direction to enable the valve to properly open and close the fluid passage.

A female coupling also has a structure similar to the above-described valve structure. When the male coupling is inserted into and connected to the female coupling, the poppet valves of the male coupling and the female coupling contact at their distal ends with each other and are moved relative to the tubular bodies of the male coupling and the female coupling, thereby opening the fluid passage of the tubular coupling bodies.

The first to sixth embodiments of the valve holding member according to the present invention will now be described in detail.

Figure 2A:
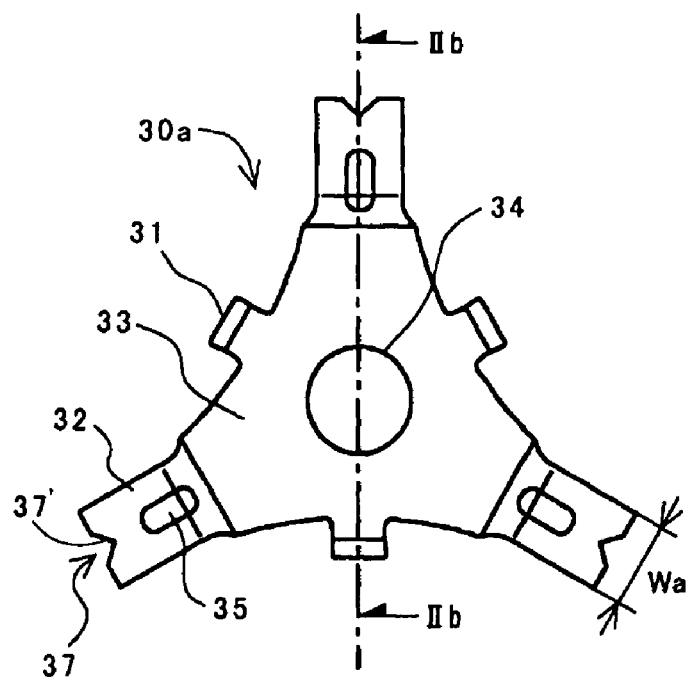
FIG. 2a is a front view of a valve holding member according to a first embodiment of the present invention.
Figure 2B:
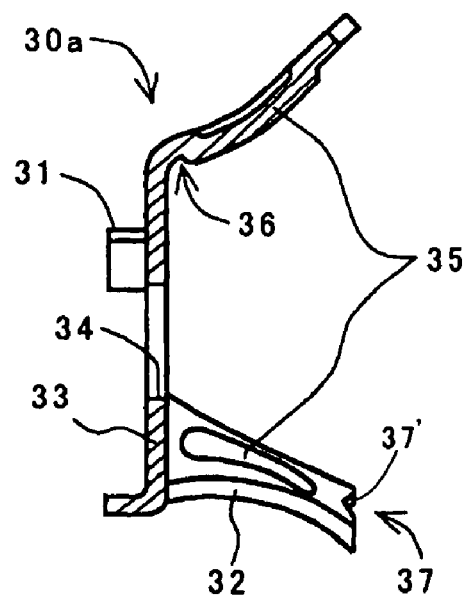

FIG. 2a is a front view of a valve holding member 30a according to the first embodiment of the present invention. FIG. 2b is a sectional view taken along line IIb-IIb of FIG. 2a.

The valve holding member 30a comprises a hub part 33 provided at the center thereof with a guide hole 34 through which a valve stem extends, three arm parts 32 formed at the peripheral edge of the hub part at constant intervals and extending in the axial direction of the valve stem (rightward direction as viewed in FIG. 2b) and the radially outward direction with respect to the axis of the valve stem, and spring retaining parts 31 each provided between each adjacent pair of the arm parts 32 and extending from the hub part 33 in a direction axially opposite to that in which the arm parts 32 extend.

Each arm part 32 is provided, between the distal end 37 thereof and a connecting portion 36 between the hub part 33 and the arm part and formed with a reinforcing protrusion 35 extending in the longitudinal direction of the arm plate. With the reinforcing protrusions 35, the stiffness of the arm parts 32 is increased. The reinforcing protrusions 35 extends substantially in the fluid passage direction when the valve holding member is set in a pipe coupling, whereby the reinforcing protrusions do not substantially increase a flow resistance in the fluid passage. The reinforcing protrusions 35 can be formed by pressing, as is the case with the arm parts 32 and the spring holding parts 31. Therefore, it is possible to improve the strength of the arm parts with little increase in cost.

Figure 8A:
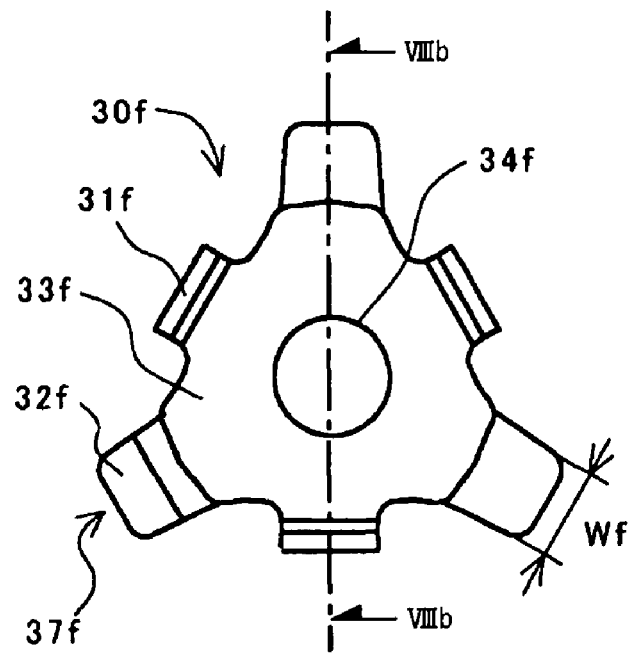
FIG. 8a is a front view of a conventional valve holding member.
Figure 8B:
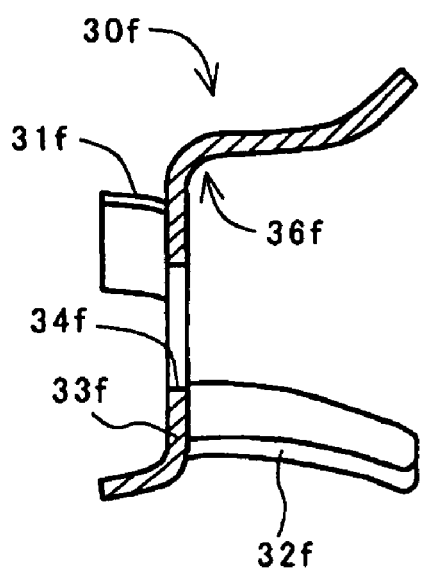

FIG. 8a is a front view of a valve holding member 30f, which is the above-described conventional type and has substantially the same arm part stiffness as that of the valve holding member 30a according to the present invention. FIG. 8b is a sectional view taken along line VIIIb-VIIIb of FIG. 8a. In comparison with the conventional type valve holding member 30f, the valve holding member 30a can be formed such that the width Wa of the arm parts 32 is smaller than the width Wf of the arm parts 32f of the valve holding member 30f and such that the interior angle between the hub part 33 and each arm part 32 is increased. As a result, the area of the hub part 33 can be smaller than that of the conventional type hub part 33f. Therefore, in the valve holding member 30a, it is possible to increase its strength compared to the conventional type valve holding member as well as to decrease the flow resistance in the fluid passage. In the conventional type of valve holding member 30f, each of the arm parts 32f acts, as a whole, as a resilient member in order to obtain resilient force necessary for firmly setting the valve holding member in a coupling body. On the other hand, in the valve holding member 30a according to the present invention, each of the curved connecting portions 36 generally acts as a resilient member.

Typical sizes of pipe couplings are ⅛ inch, ¼ inch, ⅜ inch, ½ inch, ¾ inch, 1 inch, etc. The conventional valve holding members are generally used for pipe couplings of ⅜ inch or smaller in view of strength thereof. However, the valve holding member 30a according to the present invention can be used for pipe couplings of ½ inch or larger, in addition to of ⅜ inch or smaller.

The valve holding member 30a is provided with a V-shaped notch 37' at the distal end 37 of each arm part. This enable the valve holding member 30a to be stably held at the arm holding shoulder portion 12, because the distal end 37 of each arm part engages with the inner periphery of the arm holding shoulder portion 12 at a plurality of points or lines, even if the distal end 37 of each arm part is warped or distorted in a fabrication process.

Figure 3A:
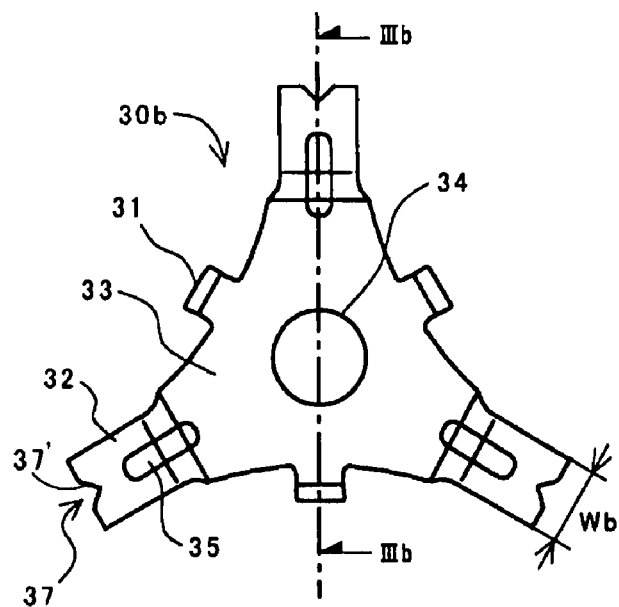
FIG. 3a is a front view of a valve holding member according to a second embodiment of the present invention.
Figure 3B:
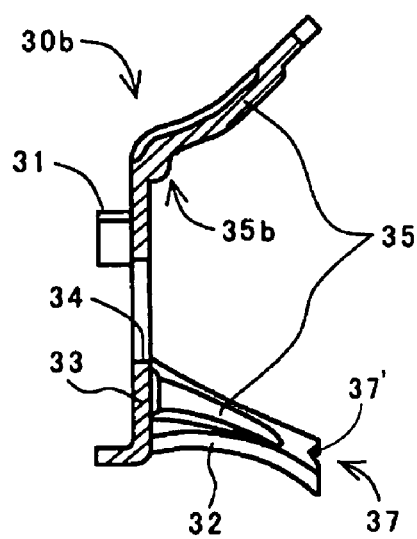

FIG. 3a is a front view of a valve holding member 30b according to the second embodiment of the present invention. FIG. 3b is a sectional view taken along line IIIb-IIIb of FIG. 3a. The valve holding member 30b is characterized in that each reinforcing protrusion 35 is extended across each corresponding curved connecting portion 36 to each corresponding reinforcing protrusion 35b formed at the periphery of the hub part 33.

With this arrangement, the strength of the valve holding member 30b can be increased by approximately 5% compared to that of the valve holding member 30a of the first embodiment. The other configuration of the valve holding member 30b is substantially the same as that of the first embodiment, and the effect obtained by the configuration is also substantially the same. Like reference numerals are used to denote like structural elements in the valve holding member 30a of the first embodiment, and their description is omitted. (The same applies to the following embodiments.)

Figure 4A:
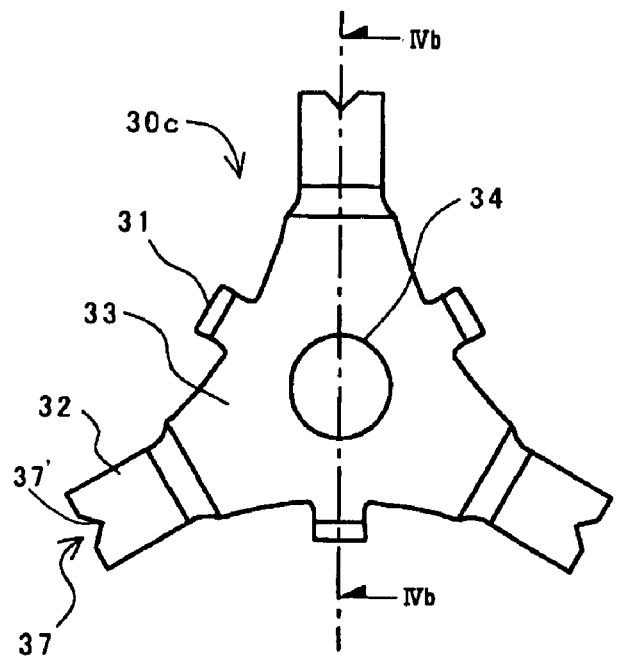
FIG. 4a is a front view of a valve holding member according to a third embodiment of the present invention.
Figure 4B:
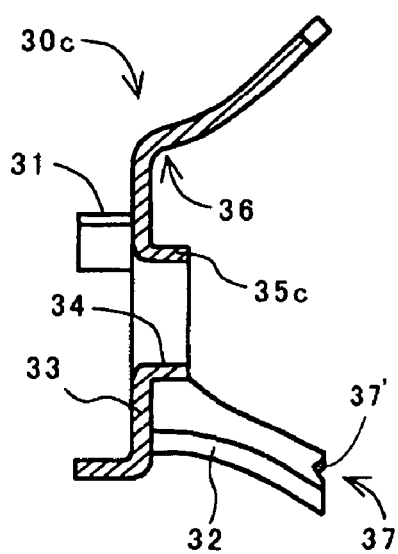

FIG. 4a is a front view of a valve holding member 30c according to the third embodiment of the present invention. FIG. 4b is a sectional view taken along line IV-IV of FIG. 4a.

The valve holding member 30c is provided, at the peripheral edge of the guide hole 34, with a tubular reinforcing part 35c as a reinforcing structure extending in the axial direction, in which the arm parts 32 extend. When the valve holding member is set in a pipe coupling, the tubular reinforcing part 35c is set along the fluid passage direction, whereby an increase in the flow resistance of the fluid passage can be substantially restrained. Moreover, since the tubular reinforcing part 35c can be formed by pressing, it is possible to improve the strength of the valve holding member with little increase in cost. More specifically, the stiffness of the hub part 33 can be increased while the resilience of the arm parts 32 is maintained, whereby the area of the hub part 33 can be made smaller than the conventional type hub part 33f.

Figure 5A:
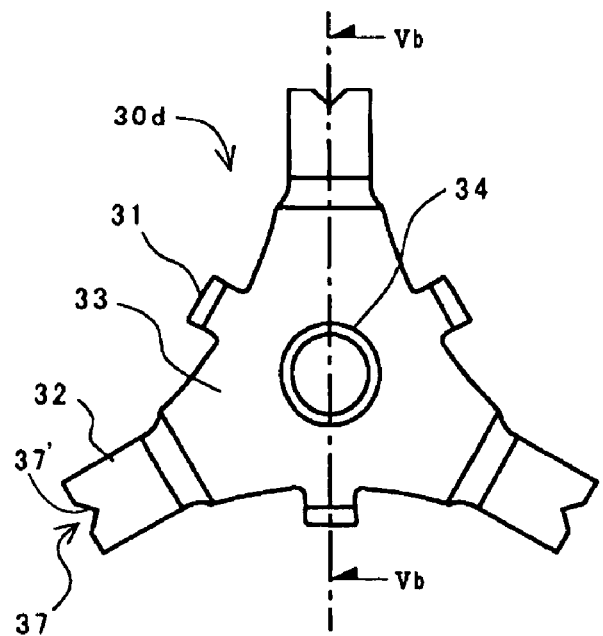
FIG. 5a is a front view of a valve holding member according to a fourth embodiment of the present invention.
Figure 5B:
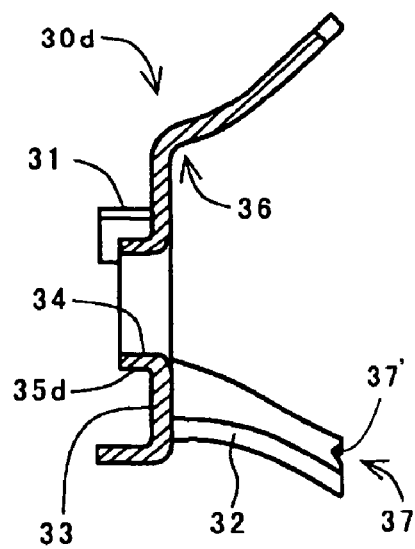

FIG. 5a is a front view of a valve holding member 30d according to the fourth embodiment of the present invention. FIG. 5b is a sectional view taken along line Vb-Vb of FIG. 5a.

The valve holding member 30d is provided, at the peripheral edge of the guide hole 34, with a tubular reinforcing part 35d as a reinforcing structure extending in a direction opposite to the direction in which the arm parts 32 extend. When the valve holding member is set in a pipe coupling, the tubular reinforcing part 35d is set along the fluid passage direction, whereby an increase in the flow resistance of the fluid passage can be substantially restrained. Moreover, since the tubular reinforcing part 35d can be formed by pressing, it is possible to improve the strength of the valve holding member with little increase in cost. More specifically, with the tubular reinforcing part 35d, the stiffness of the hub part 33 can be increased while the resilience of the arm parts 32 is maintained, whereby the area of the hub part 33 can be made smaller than the conventional type hub part 33f. The tubular reinforcing part 35d may be used as a spring retaining part by engaging the inner periphery of the coil spring 40, instead of the spring retaining parts 31. Thus, the spring retaining parts 31 are not needed, whereby the flow resistance in the fluid passage can be further reduced.

Figure 6A:
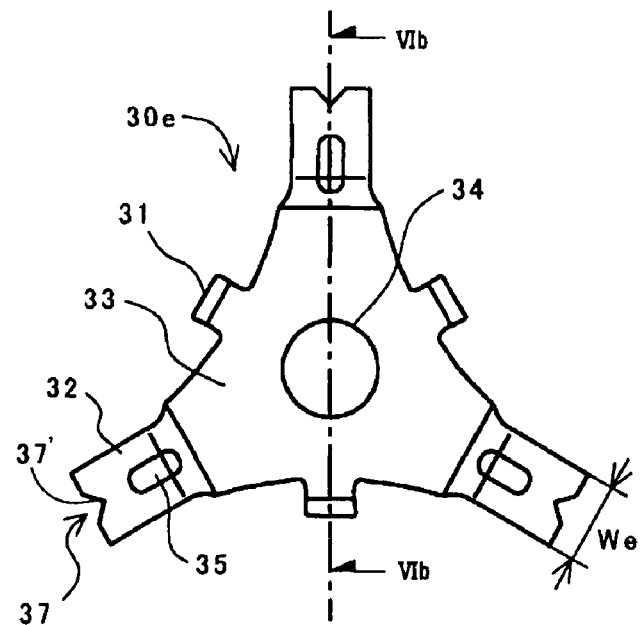
FIG. 6a is a front view of a valve holding member according to a fifth embodiment of the present invention.
Figure 6B:
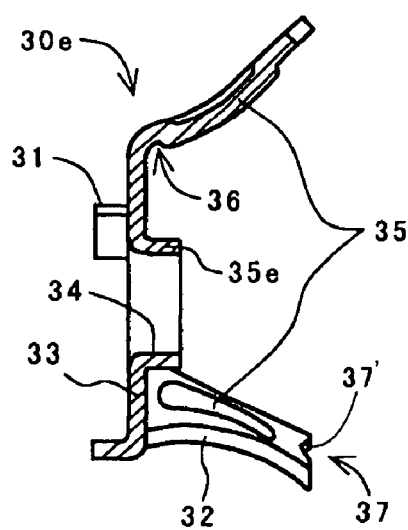

FIG. 6a is a front view of a valve holding member 30e according to the fifth embodiment of the present invention. FIG. 6b is a sectional view taken along line VIb-VIb of FIG. 6a. The valve holding member 30e is characterized in that it uses both of the reinforcing protrusions as used in the first embodiment and the tubular reinforcing part as used in the third embodiment, i.e. the reinforcing protrusions 35 of the arm parts 32 and the tubular reinforcing part 35e of the hub part 33. In this embodiment, by using the reinforcing protrusions and the tubular reinforcing part in combination, it is possible to easily obtain a valve holding member with a strength to be needed.

Figure 7A:
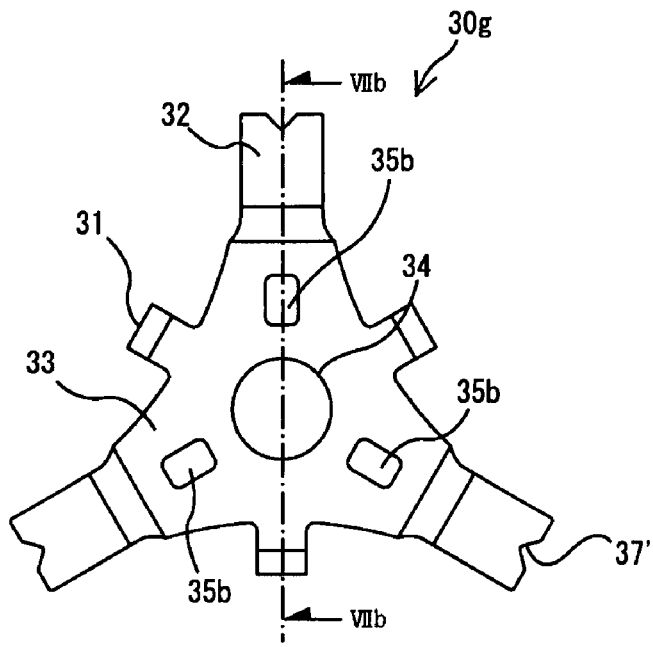
FIG. 7a is a front view of a valve holding member according to a sixth embodiment of the present invention.
Figure 7B:
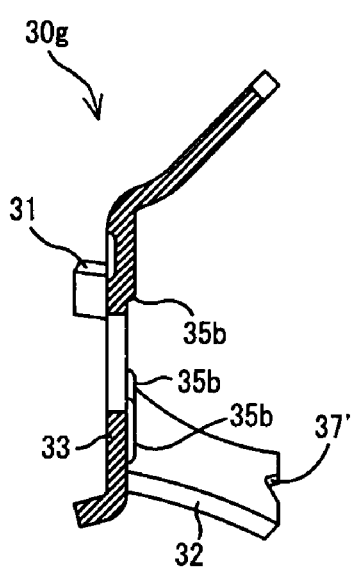

FIG. 7a is a front view of a valve holding member 30g according to the sixth embodiment of the present invention. FIG. 7b is a sectional view taken along line VIIb-VIIb of FIG. 7a. The valve holding member 30g is characterized in that the hub part 33 is provided with reinforcing parts 35b.

As described above, the present invention provides valve holding members which are provided, at various portions thereof, with reinforcing structures so that valve holding members can be used for high-pressure and large-diameter pipe couplings. Moreover, since the reinforcing structures may be formed along the fluid passage direction, it is possible to increase the strength of the valve holding member without substantial increase in the flow resistance in the fluid passage. Further, each reinforcing structure is formed by pressing, whereby it is possible to improve the strength of the valve holding member with little increase in cost.

The invention claimed is:

1. A valve holding member for holding a valve displaceably along a fluid passage of a pipe coupling for opening and closing the fluid passage, the valve holding member being made of a sheet metal, the valve holding member comprising:
   a hub part having a shape of a flat plate that extends normal to an axis of the fluid passage and having a guide hole extending through the hub part along the axis of the fluid passage, the guide hole being configured so that a valve stem of the valve extends therethrough;
   three arm parts formed at a peripheral edge of the hub part at a regular interval, the arm parts extending from the peripheral edge in an axial direction and in a radially outward direction with respect to the axis of the fluid passage; and
   a plurality of spring retaining parts each centrally formed between the arm parts at the peripheral edge of the hub part so as to extend in an axial direction opposite to the axial direction in which the arm parts extend, the spring retaining part having a width smaller than the arm part;
   wherein the arm parts each have an elongated reinforcing protrusion that is located centrally relative to a width of the arm part, extends along a longitudinal axis of the arm part, and protrudes radially outward or inward relative to the axis of the fluid passage,
   wherein the arm parts each have a distal end edge extending normal to the longitudinal axis of the arm part and engageable with an annular holding shoulder portion formed on an inner wall of the fluid passage of the pipe coupling, the distal end edge having at the central portion thereof a triangular shape recess a base edge of which is aligned with the distal end edge so that the distal end edge is engageable with the annular holding shoulder portion at opposite ends thereof; and,
   wherein the valve holding member further comprises a tubular reinforcing part extending from a peripheral edge of the guide hole of the hub part in the axial direction in which the arm parts extend.

* * * * *